US006698566B2

(12) United States Patent
Jong

(10) Patent No.: US 6,698,566 B2
(45) Date of Patent: Mar. 2, 2004

(54) CLUTCH TYPE SAFETY SWITCH FOR POWER TOOLS

(75) Inventor: Jung-Chang Jong, Cungli (TW)

(73) Assignee: Jenn Feng Industrial Co., Ltd., Taoyuan (TW)

( * ) Notice: Subject to any disclaimer, the term of this patent is extended or adjusted under 35 U.S.C. 154(b) by 88 days.

(21) Appl. No.: 10/003,148

(22) Filed: Nov. 14, 2001

(65) Prior Publication Data

US 2003/0088987 A1 May 15, 2003

(51) Int. Cl.[7] .................................................. F16D 9/00

(52) U.S. Cl. ............................... 192/131 R; 192/69.82; 56/10.5; 83/DIG. 1

(58) Field of Search ............................ 192/131 R, 69.8, 192/129 R, 12 R, 69.82; 30/381; 56/10.5; 83/DIG. 5; 74/491, 523

(56) References Cited

U.S. PATENT DOCUMENTS

| | | | | |
|---|---|---|---|---|
| 3,991,864 A | | 11/1976 | Muller | |
| 4,091,896 A | | 5/1978 | Wieland et al. | |
| 4,152,833 A | * | 5/1979 | Phillips | 30/382 |
| 4,335,514 A | * | 6/1982 | Overy et al. | 30/382 |
| 4,432,139 A | * | 2/1984 | Kohler et al. | 30/381 |
| 4,594,780 A | * | 6/1986 | Schliemann et al. | 30/382 |
| 4,680,862 A | * | 7/1987 | Wieland et al. | 30/381 |
| 4,753,012 A | * | 6/1988 | Schurr | 30/382 |
| 5,065,476 A | * | 11/1991 | Dohse et al. | 16/426 |
| 5,243,764 A | * | 9/1993 | Wieland | 30/383 |
| 5,709,032 A | * | 1/1998 | Mizutani et al. | 30/382 |
| 5,724,737 A | * | 3/1998 | Stones | 30/228 |

* cited by examiner

*Primary Examiner*—Saul Rodriguez

(57) ABSTRACT

A clutch safety switch of a power chainsaw includes a safety member slidably connected to the casing and a trigger which is not able to be squeezed when the safety member is not slid away. A gear connected to the power source has engaging recesses and a clutch member is rotatably mounted to an output shaft which is independent from the gear. An engaging member is movably mounted to the output shaft and retained in a central hole in the clutch member. A link is connected between the safety member and the clutch member which is rotated and moved toward the gear to let engaging member be engaged with the recesses in the gear to transfer the power to the output shaft.

6 Claims, 4 Drawing Sheets

CLUTCH TYPE SAFETY SWITCH FOR POWER TOOLS

FIELD OF THE INVENTION

The present invention relates to a clutch type switch for a chainsaw to prevent the chainsaw from being activated by touching the trigger unintentionally.

BACKGROUND OF THE INVENTION

A conventional switch device for a power tool generally includes a trigger which is engaged with a trigger assembly. When pulling the trigger, the circuit of the power tool is activated and the tool is operated. However, most of the triggers have no safety device to avoid the user to touch the trigger unintentionally so that it is possible that the trigger is pulled unintentionally and the chainsaw for example is running. This is extremely dangerous so that there is a need to develop a safety device to prevent the situation from happening.

SUMMARY OF THE INVENTION

In accordance with one aspect of the present invention, there is provided a clutch safety switch for a power tool and the clutch safety switch comprises a casing having a slot for a safety member slidably engaged therewith. A lug extends from an underside of the safety member and a trigger is pivotally located in the casing and has a protrusion which is interfered by the lug of the safety member. A link has an end thereof connected to the safety member. A gear is received in the casing and connected to a power source. The gear is independently mounted to an output shaft and a plurality of engaging recesses are defined in the gear. A plurality of guide rods and guide members respectively extend from an inside of the casing. A clutch member is mounted to the output shaft and has a plurality of blades each of which has a guide slot in which respective one of a plurality of guide rods extends. Each blade has a tapered extension extending therefrom which is able to be movable along the guide member. An engaging member is movably mounted to the output shaft and has bosses extending from a side thereof. A cover is fixed on the clutch member end the engaging member is retained in a central hole in the clutch member by the cover. A link is connected between the safety member and one of the blades of the clutch member.

The primary object of the present invention is to provide a clutch safety switch for a power tool wherein the trigger cannot be squeezed if the safety member is not slid. The power is not transferred to the chainsaw when releasing the trigger.

The present invention will become more obvious from the following description when taken in connection with the accompanying drawings which show, for purposes of illustration only, a preferred embodiment in accordance with the present invention.

DETAILED DESCRIPTION OF THE INVENTION

Figure 1:
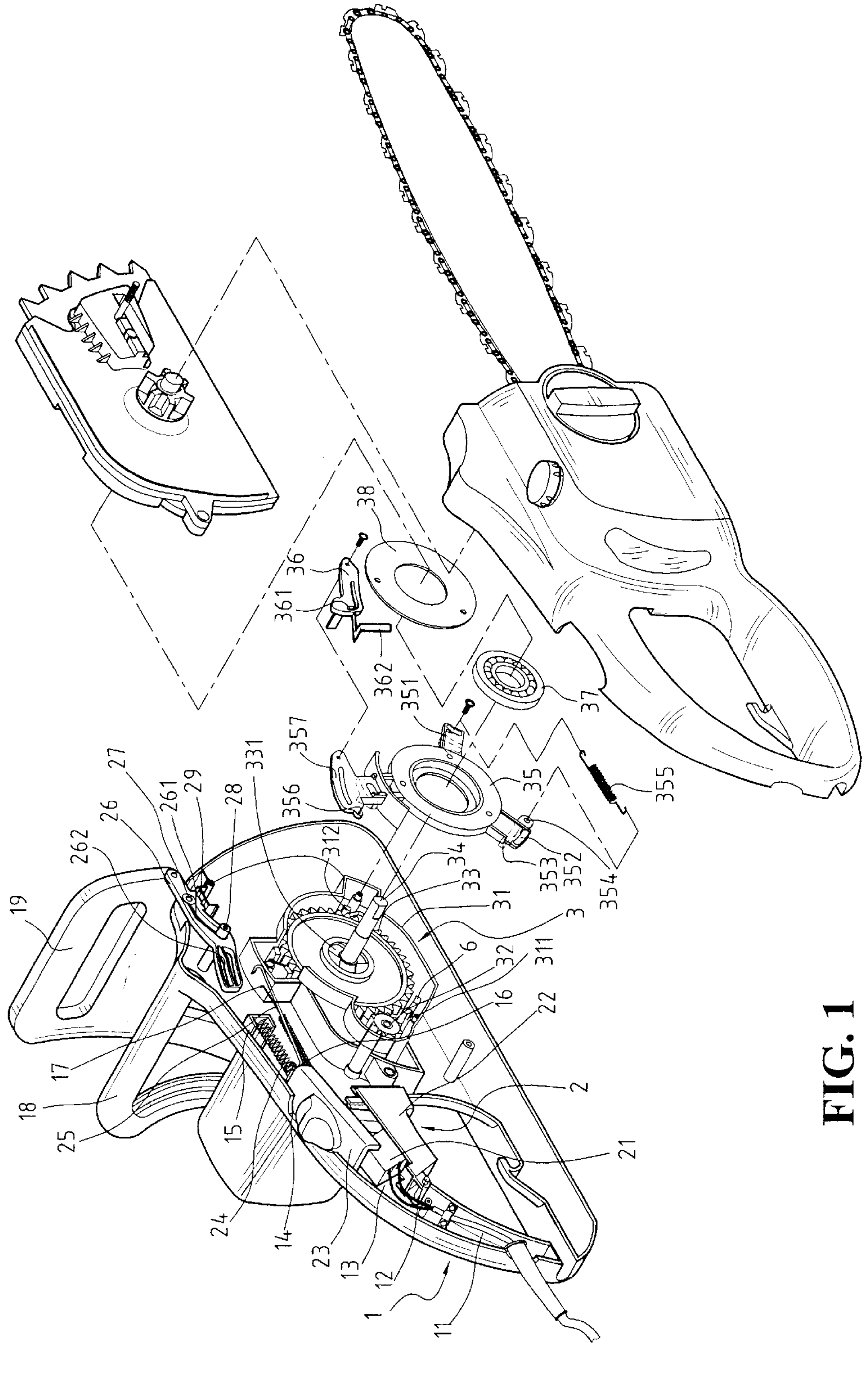
FIG. 1 is an exploded view to show a clutch safety device of a power chainsaw of the present invention.
Figure 2:
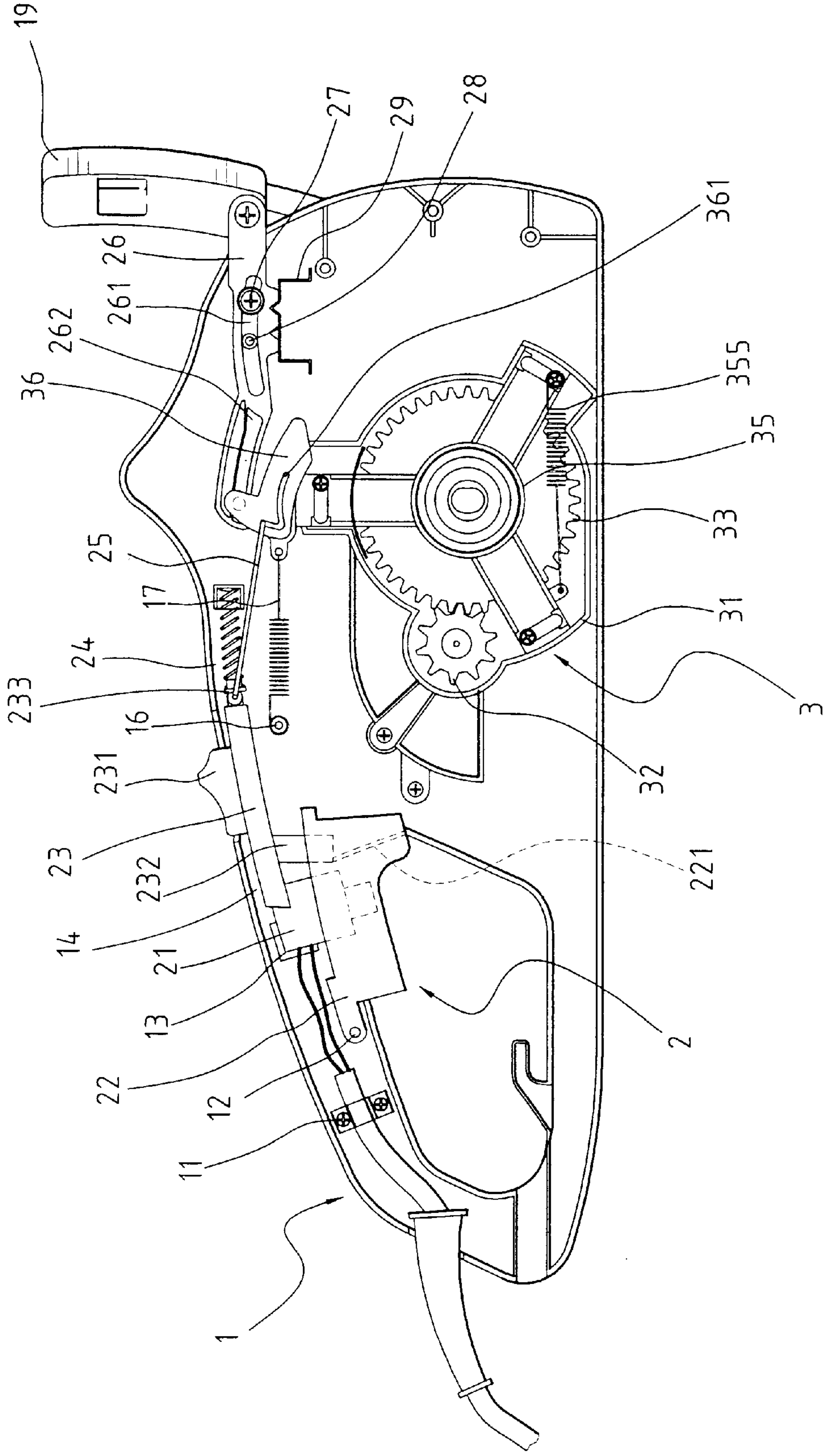
FIG. 2 is a side view to show the clutch safety device of the present invention.

Referring to FIGS. 1 and 2, the clutch switch device of the present invention comprises a casing 1, a trigger assembly 2 and a clutch device 3. The casing 1 includes a handle 11 of the power chainsaw and a pin 12 for pivotally connecting the trigger assembly 2 extends from an inside of the casing 1. An activation switch frame 13 is connected above the trigger assembly 2. A rod 16 is located in the casing 1 and a spring 17 has one end thereof connected to the rod 16. The trigger assembly 2 includes an activation switch 21 which is received in the activation switch frame 13 and a trigger 22 which has a protrusion 221 and is pivotally mounted to the pin 12. A slot 14 is defined through the casing 1 so that a safety member 23 is slidably engaged with the slot 14 and a stop member 15 located at a closed end of the slot 14. A thumb portion 231 extends from the safety member 23 and through the slot 14, a lug 232 extending from an underside of the safety member 23 so that when the protrusion 221 contacts the lug 232, the trigger 22 cannot be squeezed. The safety member 23 has a head 233 and a link 25 is connected to the head 233. A spring 24 has one end connected to the head 233 and the other end of the spring 24 is connected to the stop member 15. The clutch device 3 includes a first gear 32 which is connected to a power source such as a motor (not shown) and a clutch device casing 31 for an output shaft 34 extending therefrom. A second gear 33 is located in the clutch device casing 31 and engaging recesses 331 is defined in a central portion of the second gear 33. The second gear 33 and the output shaft 34 are two independent members which are not connected with each other. A clutch member 35 has three blades 351 extending radially outward therefrom at equal intervals and the output shaft 34 extends through a central hole of the clutch member 35. A guide slot 352 is defined in a remote end of each of the blades 351 and a tapered extension 353 extends from each of the blades 351. Three guide rods 311 and three guide members 312 extend from the clutch device casing 31. The guide rods 311 are received in the guide slots and the guide members 312 are shaped to cooperate with the tapered extensions 353. A spring 355 has one end connected to a hole 354 defined in one of the three blades 351 and the other end of the spring 355 is connected to a guide rod 311 in one of the guide slots 352. A pushing portion 357 is connected to a remote end of one of the blades 351 and has a hole 356 for being connected to the other end of the spring 17. A plate 36 is connected to the pushing portion 357 and has a hole 361 for being connected to the other end of the link 25. A support plate 362 is connected to the plate 36 so as to prevent the link 25 from dropping from the hole 361. An engaging member 37 has bosses 371 on a side and is movably mounted to the output shaft 34. A cover 38 is mounted to the output shaft 34 and fixed to the clutch member 35 so that the engaging member 37 is retained in the central hole of the clutch member 35. When the bosses 371 are engaging with the engaging recesses 331 in a central portion of the second gear 33, the output shaft 34 is driven by the second gear 33. A plurality of rollers are embedded in the engaging member 37 so as to reduce the frictional wear between the cover 38 and the engaging member 37.

Figure 3:
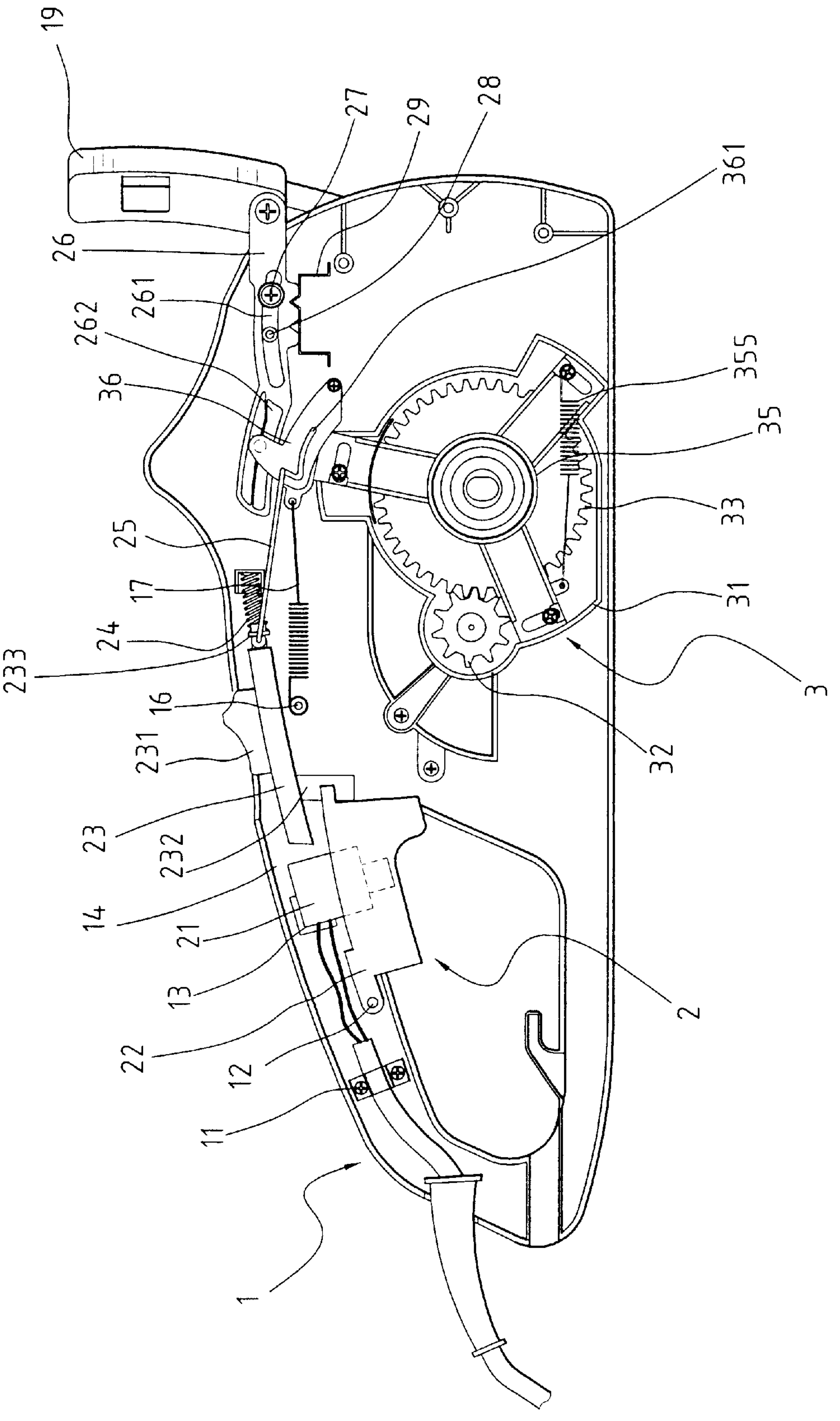
FIG. 3 is a side view to show the clutch safety device of the present invention wherein the trigger is squeezed.
Figure 4B:
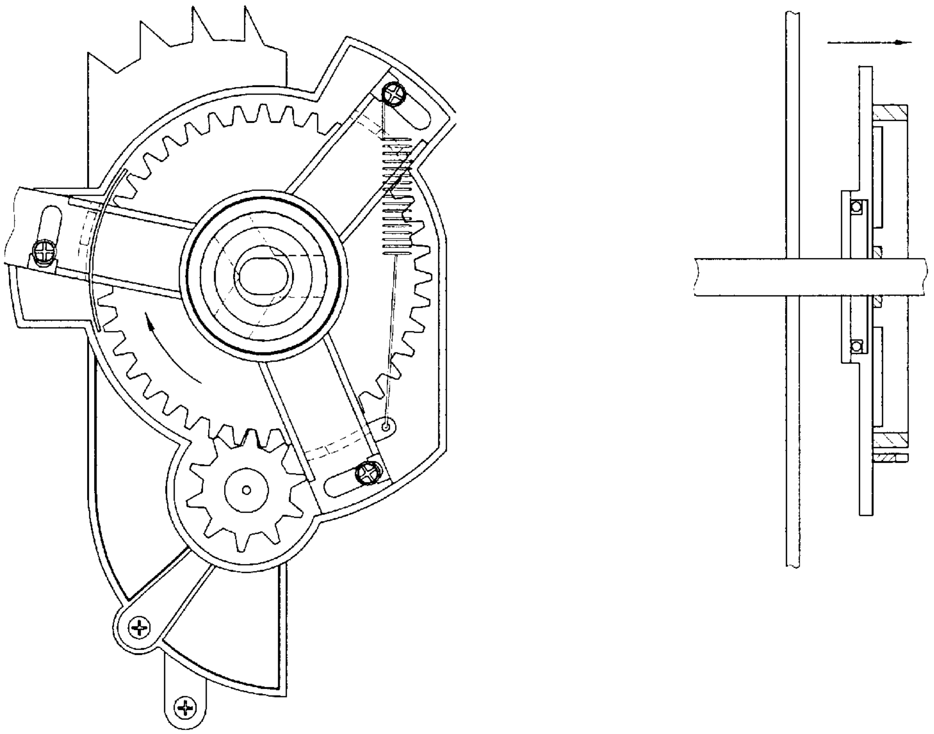
FIG. 4B shows that the engaging member is moved to engage with the clutch member of the clutch safety device of the present invention.
Figure 4A:
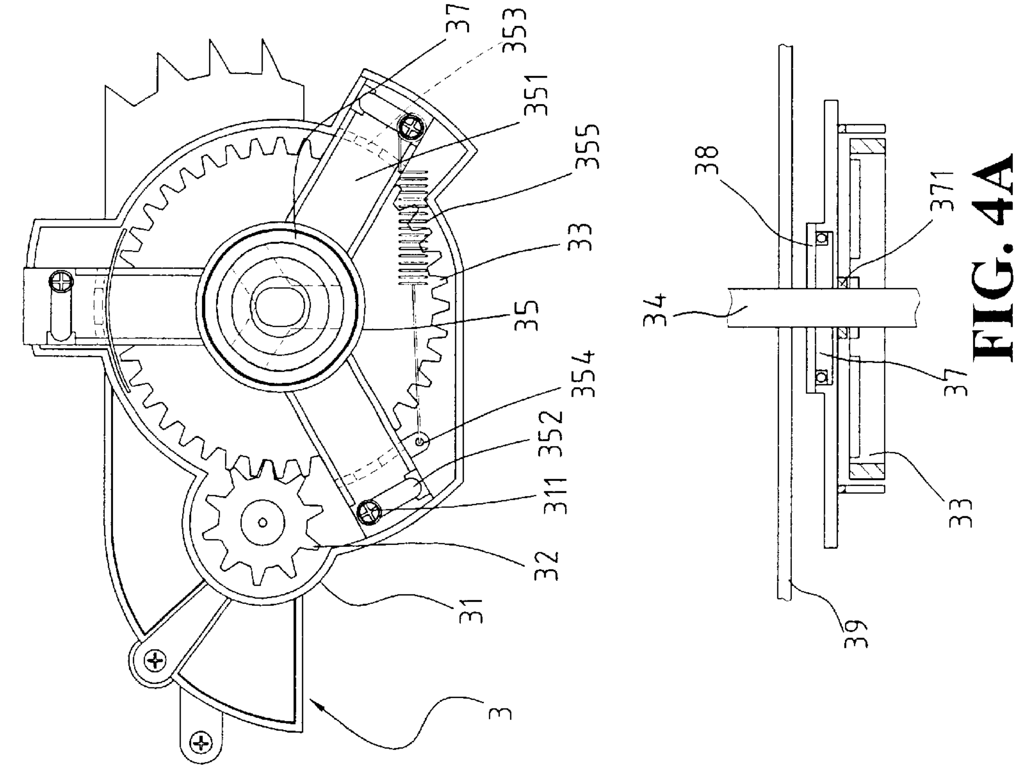
FIG. 4A shows that the engaging member is not yet moved to engage with the clutch member of the clutch safety device of the present invention.

As shown in FIGS. 3 and 4A, when the safety member 23 is not slid toward the chainsaw, the protrusion 221 contacts the lug 232 so that the trigger 22 cannot be squeezed. After the safety member 23 is pushed to remove the lug 232, the trigger 22 can be squeezed to activate the activation switch 21 to operate the chainsaw. In the meanwhile, the spring 24 is compressed when the safety member 23 is pushed and the link 25 pushes the plate 36 so as to let the clutch member 35 rotate clockwise. The rotation of the clutch member 35 and its blades 351 make the tapered extensions 353 move along the guide members 312 to let the bosses 371 move and engage with the engaging recesses 331 as shown in FIG. 4B. Therefore, the power can be transferred from the second gear 33 to the output shaft 34 to drive the chainsaw.

When releasing the trigger 22, the activation switch 21 is released and the safety member 23 is moved back by the spring 24. The springs 17 and 355 pull the clutch member 35 to rotate counter clockwise and the bosses 371 are disengaged from the engaging recesses 331. The power is then not transferred to the output shaft 34 and the chainsaw stops.

While we have shown and described the embodiment in accordance with the present invention, it should be clear to those skilled in the art that further embodiments may be made without departing from the scope of the present invention.

What is claimed is:

1. A clutch safety switch for a power tool, comprising:

a casing having a slot defined therethrough and a safety member slidably engaged with said slot, a lug extending from an underside of said safety member, a trigger pivotally located in said casing and having a protrusion which is interfered by said lug of said safety member, a link having a first end thereof connected to said safety member;

a gear received in said casing and adaptively connected to a power source, said gear being independently mounted to an output shaft and having a plurality of engaging recesses defined in said gear;

a plurality of guide rods and a plurality of guide members respectively extending from an inside of said casing;

a clutch member mounted to said output shaft and having a plurality of blades each of which has a guide slot in which a respective one of said a plurality of guide rods extends, each blade having a tapered extension extending therefrom which is movable along a respective one of said plurality of guide members;

an engaging member movably mounted to said output shaft and having bosses extending from a side thereof; and a cover covering said clutch member;

wherein said engaging member is retained in a central hole in said clutch member by said cover, and a second end of said link is connected to one of said plurality of blades of said clutch member.

2. The clutch safety switch as claimed in claim 1, wherein one of said plurality of blades has a plate connected thereto, said second end of said link is connected to said plate, and a spring has one end thereof connected to said plate and the other end fixed to one of said plurality of guide rods in said casing.

3. The clutch safety switch as claimed in claim 1, wherein a spring has one end thereof connected to one of said plurality of blades and the other end of said spring is connected to one of said plurality of guide rods in said guide slot of one of the rest of said plurality of blades.

4. The clutch safety switch as claimed in claim 1, wherein a plurality of rollers are embedded in said engaging member and said cover contacts said plurality of rollers.

5. The clutch safety switch as claimed in claim 1, wherein a spring has one end thereof connected to said safety member and the other end of said spring is connected to a stop member in said casing.

6. The clutch safety switch as claimed in claim 1, wherein a thumb portion extends from said safety member and through said slot.

* * * * *